UNITED STATES PATENT OFFICE.

KARL ELBEL, OF BIEBRICH, GERMANY, ASSIGNOR TO THE FIRM OF KALLE & CO., AKTIENGESELLSCHAFT, OF BIEBRICH, GERMANY.

MANUFACTURE OF A NEW PYRAZOLONE-AZO DYE.

1,026,257.  Specification of Letters Patent.  Patented May 14, 1912.

No Drawing. Application filed September 18, 1911. Serial No. 649,959.

*To all whom it may concern:*

Be it known that I, KARL ELBEL, a citizen of the German Empire, residing at Biebrich-on-the-Rhine, Germany, have invented certain new and useful Improvements in the Manufacture of a New Pyrazolone-Azo Dye, of which the following is a specification.

In my specification of the same date I have described a process for producing fast azo dyestuffs by coupling the chloro-1-diazo-2-oxy-naphthalene-4-sulfonic acid with azo dyestuff components including pyrazolone. I have further found that a very valuable dyestuff of this kind can be obtained by coupling the aforesaid chloro-1-diazo-2-oxy-naphthalene-4-sulfonic acid with 1-phenyl-3-methyl-5-pyrazolone.

The present invention relates to a dyestuff obtainable from the aforesaid chloro-1-diazo-2-oxy-naphthalene-4-sulfonic acid with a pyrazolone such as the 1-phenyl-3-methyl-5-pyrazolone above mentioned.

I proceed as follows: The chlorinated diazo compound obtained according to the process of Example 1 of my above mentioned application *i. e.* by chlorination of 125 kilograms of 1-diazo-2-oxy-naphthalene-4-sulfonic acid in presence of fuming sulfuric acid, is stirred with 300 liters of water and neutralized by the addition of calcined sodium carbonate. To this neutral solution there is added a warm solution of 95 kilograms of 1-phenyl-3-methyl-5-pyrazolone and 75 kg. carbonate of sodium in 400 liters of water and 65 kg. of caustic soda lye of 40° Bé. The temperature may rise during this procedure up to about 40 degrees centigrade. Afterward the mass is stirred some hours and left until next morning. Then it is diluted with 1250 liters of water and acidified with hydrochloric acid, whereupon the dyestuff is separated completely by means of 250 kg. of common salt. It is filtered, pressed and dried. The dyestuff thus obtained is soluble in water with a yellowish-red color which turns into a dull bluish-red on the addition of alkali. It produces on wool in an acid bath reddish-orange tints which after treatment with bichromates turn into bright bluish-red ones. They are especially fast against light and potting and against hot diluted acids or alkalis. On treatment with reducing agents the dyestuff is decomposed into chloro-1-amino-2-oxy-naphthalene-4-sulfonic acid and 4-amino-1-phenyl-3-methyl-5-pyrazolone.

I claim:

1. As a new product an azo coloring matter obtainable by combining the chloro-1-diazo-2-oxy-naphthalene-4-sulfonic acid with a pyrazolone, which dyestuff is decomposed when treated with reducing agents into a chloro-1-amino-2-oxy-naphthalene-4-sulfonic acid, and an amino derivative of the pyrazolone component used.

2. As a new product the azo coloring matter obtainable by combining the chloro-1-diazo-2-oxy-naphthalene-4-sulfonic acid with 1-phenyl-3-methyl-5-pyrazolone, which is in dry state a red powder, soluble in water with a yellowish-red color turning into a dull bluish-red on the addition of alkali, and in concentrated sulfuric acid with a pure bluish-red color, producing on wool in an acid bath reddish-orange tints, which after treatment with bichromate turn into a bright bluish-red, and being decomposed by means of reducing agents into chloro-1-amino-2-oxy-naphthalene-4-sulfonic acid on the one hand, and 4-amino-1-phenyl-3-methyl-5-pyrazolone on the other hand.

In testimony whereof I have signed my name to this specification in the presence of two subscribing witnesses.

KARL ELBEL.

Witnesses:
 AUGUST ROBB,
 JOHANN RAMENSEC.